Aug. 25, 1970  M. B. CRUZ  3,525,238

FLEXIBLE COUPLINGS FOR MECHANICAL TRANSMISSIONS

Filed Sept. 25, 1968

INVENTOR.
MODESTO BELTRAN CRUZ
BY
Eyre, Mann & Lucas
ATTORNEYS

United States Patent Office 3,525,238
Patented Aug. 25, 1970

3,525,238
FLEXIBLE COUPLINGS FOR MECHANICAL TRANSMISSIONS
Modesto Beltran Cruz, Mexico City, Mexico, assignor to Industrias Gabel, S.A., Mexico City, Mexico, a corporation of Mexico
Filed Sept. 25, 1968, Ser. No. 762,487
Int. Cl. F16d 3/12, 3/58
U.S. Cl. 64—11          10 Claims

ABSTRACT OF THE DISCLOSURE

A flexible coupling includes a pair of hubs for coupling two shafts together, the hubs each having a flat land on one surface thereof. The lands are grooved on their surfaces to receive resilient elements which are mounted in the grooves. The resilient elements have a thickness greater than the depth of one groove, so that when mounted in a groove, each element projects above the land surface to engage an opposed groove in the land surface of the other hub whereby torque is transmitted from one hub to the other through the resilient elements.

---

This invention relates to a flexible coupling for smoothly transferring torque from a driving to a driven shaft and for absorbing shock and acceleration incident therewith to protect the machinery being driven.

The device of the present invention generally comprises a hub to which the driven shaft is secured and a hub to which the driving shaft is secured, and at least one resilient element, which may be made of rubber or plastic material, interposed between the two hubs and through which the torque from the driving shaft is transferred to the driven shaft. The device is preferably constructed so that essentially all of the torque is transmitted from driving to driven shaft via the resilient element and little or none via contact between opposing hub surfaces.

For best results the hubs are constructed to provide for removal and replacement of the resilient elements without disassembly of the coupling from the shafts, whereby ease of maintenance not before possible with prior art couplings is achieved. However, the coupling can be made without the removability feature without in any way affecting the torque transmissibility between the shafts or in any way causing torque to be transferred via direct contact between hub surfaces rather than through the resilient elements.

The hubs may be of any rotationally balanced shape and are preferably made to have opposed flat land surfaces with one or more grooves preferably semihemispherical or semicylindrical in the face of each land, the grooves in each land being of equal number and in opposed alignment to each other to accommodate resilient elements. The resilient elements are equal in number to the number of opposed grooves and are cylindrical in shape, although they may also be square or rectangular or of any other shape. However, these other shapes are not as preferred as the round or cylindrical ones.

The depth of the grooves cut in each land bears a direct and critical relationship to the size of the resilient element, viz. the thickness of the resilient element is greater than the depth of a groove in which it is mounted so that the resilient element will project above the land surface of the hub in which it is mounted to engage an opposed groove in the other hub land surface. However, it is preferable that the thickness of the resilient element be equal to or greater than the combined depth of two opposed grooves in the two land surfaces so that the land surfaces of opposing hubs just barely touch or do not touch at all. The resilient element preferably completely fills the grooves in the lands so as to prevent any non-cushioned relative movement between the hubs, such as would generate unnecessary and undesirable shock due to the looseness of the coupling.

If the hubs are allowed to contact each other, then the frictional forces arising between the contacting portions will act to transmit torque. However, torque transmission via contact between the hubs will be slight as long as the thickness of the resilient element is equal to or greater than the combined depth of two opposing grooves and will be substantially less than the torque transmitted via the resilient elements. It is desirable to keep frictional contact forces between the hubs as low as possible and it is even more desirable to eliminate them entirely. If the frictional contact force is sufficiently great, the coupling will remain rigid and the resilient elements will not be able to act as torque transmission members or shock absorbers.

It is essential that the shafts be rigidly fixed to the hubs so as not to permit the shaft to move rotationally relative to the hub it is fixed to during operation of the coupling. However, the shafts and rigidly attached hubs may be allowed to move axially relative to each other because, in that case, the resilient elements will also act as axial shock absorbers. More specifically, when the hubs have axial latitude and are rotationally accelerated, the resilient elements will roll partially out of the grooves due to the relative rotational movement between the hubs and thereby will slightly separate the hubs axially. The resilient elements will then be in axial compression between the hubs as well as in torsional compression and will act as axial as well as torsional shock absorbers. If the resilient elements are made somewhat thicker than the combined depth of opposing grooves, then the resilient element will always act as an axial as well as a torsional shock absorber without the necessity of its first having to roll partially up out the groove. Also, when the hubs are always slightly separated, as is the case when the resilient element is thicker than the combined depth of opposing grooves, then the coupling will be able to accommodate small amounts of shaft misalignment.

The grooves cut into the lands of the hubs preferably are made to extend all the way through the exterior surface of the hub, thereby allowing insertion and removal of the resilient elements while the hubs are mounted to the shafts, without disassembly of the coupling, simply by pulling or pushing the resilient element out and replacing it with another by inserting it into the groove through the opening in the exterior surface of the hub. However, it is preferable to provide a removable covering for the exterior openings to prevent the resilient elements from being dislodged from the groove and thrown outwardly out of the hub by centrifugal force when the coupling is rotated. The removable coverings may take any form such as a clamp or girt, or any other guard which will hold the resilient elements in place. If the centrifugal force tending to throw the resilient elements out of the grooves is not too great, and the resilient elements are larger than the combined depth of the two opposed grooves, then the resilient elements can be compressed between the hubs to frictionally hold the resilient elements in place in opposition to the centrifugal force during rotation of the coupling.

Referring now to the drawings which illustrate preferred embodiments of the invention and in which like numerals refer to like parts:

Figure 1:
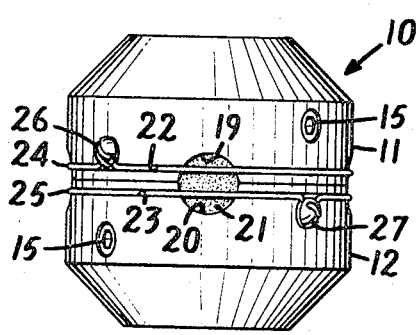
FIG. 1 is a side elevational view of one embodiment of the invention illustrating a completely assembled flexible coupling without the shafts attached.
Figure 2:
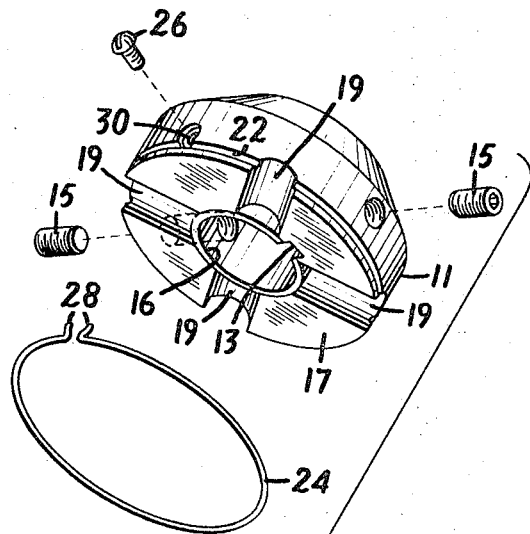
FIG. 2 is an exploded view of the embodiment of FIG. 1.

Referring now to FIGS. 1 and 2, there is seen a coupling 10 consisting of a pair of hubs 11 and 12 to which a pair of shafts (not shown) are to be mounted via keyed slots 13 and 14, respectively. The shafts are fixedly mounted to the hubs by set screws 15 which extend into the central bore 16 in each hub. At least one set screw in each hub preferably extends into the key slots 13, 14 to engage the key of the shaft (not shown). The hubs may be of any shape other than that shown as long as they are rotationally balanced.

The hubs 11, 12 have lands 17, 18, respectively, thereon into which are cut a plurality of grooves 19 and 20 respectively to receive resilient elements 21. The grooves 19, 20 are preferably cylindrical as shown, as are the resilient elements 21, and are preferably cut so that the diameter of the elements 21 is equal to or greater than the maximum combined groove depth of two opposing grooves 19, 20 to assure that the lands 17, 18 of the respective hubs do not touch or just barely touch when the resilient elements are in place and the hubs are assembled together. Any number of grooves and resilient elements can be used greater or less than the four depicted in the drawings depending upon the user's desire, and the magnitude of the torque to be transmitted. Also, the grooves may be cut fully diagonally across the land surface whereby only two resilient elements substantially equal in length to the diameter would be used rather than the four depicted. However, the number of grooves and resilient elements are not restricted to only even numbers thereof and any combination, odd or even, may be used.

The grooves 19, 20 are preferably cut so as to extend through the exterior surface of the hubs 11, 12 so that when the hubs are assembled together as in FIG. 1, there is an opening 22 in the exterior surface between the hubs by which the resilient elements may be removed and replaced without diassembling the coupling. However, the device can also be provided with a smooth exterior surface with no provision for access to the resilient elements for removal without disassembly of the coupling, although this is not preferred.

In order to retain the resilient elements within the grooves 19, 20 during rotation of the hubs, grooves 22 and 23, respectively, are cut into the exterior surface of each hub to carry the girts 24, 25 therein. The girts 24, 25 are disposed in front of the resilient elements 21 to block their removal or being thrown out of the coupling by centrifugal force. The girts 24, 25 are held in place by screws 26, 27, the screws being adapted to hold the girt in place by clamping the tongs 28, 29 on each girt to the hub exterior. The tongs are made to conform to a recess 30, 31 in each hub to securely lock the girts to the hub. The girts are removable to allow removal of the resilient element by simply removing the screw, lifting the tongs and spreading them apart to increase the diameter of the girt. The girt is mounted to the hubs simply by reversing the above steps.

It is to be understood that any means may be used to retain the resilient elements in place against the centrifugal force tending to fling the resilient element out of the grooves during rotation of the coupling, including compressing the resilient elements between the hubs so that frictional resistance between the resilient element and the hubs prevent its being thrown out of the grooves during rotation of the coupling.

The grooves 19, 20 may also be fully cut diagonally across the hub land such that only two resilient elements substantially equal in length to the diameter of the hub are used, whereby replacement is accomplished simply by pushing the resilient element out and replacing it with a new one. One advantage of utilizing only two resilient elements equal in length to the diameter of the hub is that the weight of the resilient element is equally distributed on both sides of the rotation axis of the hubs to reduce or eliminate the net centrifugal force acting on each resilient element during hub rotation.

In operation, assuming the driving shaft to be coupled to hub 11, the torque will be transmitted to hub 12 only via the resilient elements 21. If the driving shaft is accelerated, the acceleration will compress the resilient elements so that the driven shaft coupled to hub 12 will accelerate at a somewhat slower rate than the driving shaft. Also, shock will be absorbed by the resilient element to allow the driven shaft to more smoothly accelerate in response to the shock load than would otherwise be possible with a rigid coupling. If the diameter of the resilient elements is larger than the combined depth of two opposing grooves, the flexible coupling will also be able to accommodate angular misalignment between the shafts by bending and compressing the resilient elements.

Figure 3:
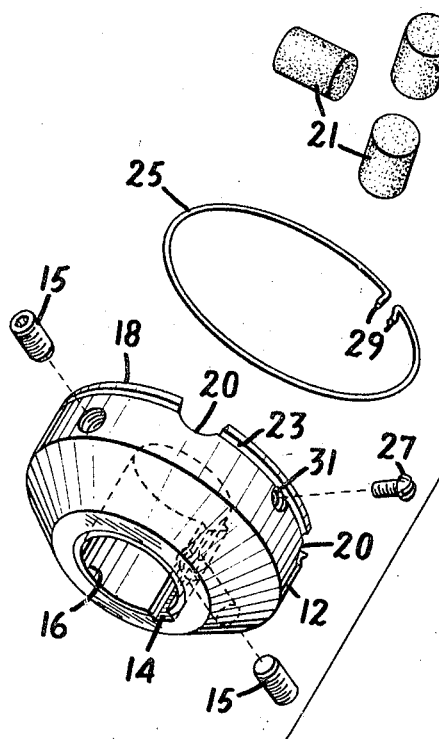
FIG. 3 is a side elevation view of a second embodiment of a completely assembled flexible coupling without the shafts attached.
Figure 4:
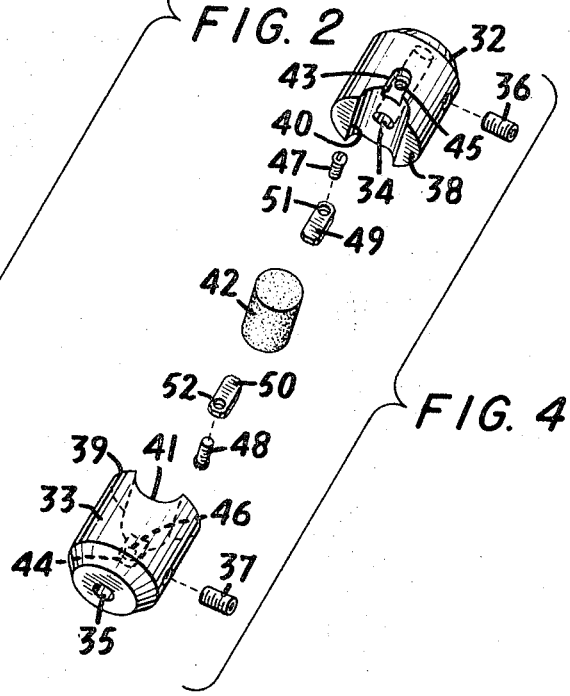
FIG. 4 is an exploded view of the embodiment of FIG. 3.

Referring now to FIGS. 3 and 4 wherein a second embodiment of the invention is depicted, there is seen a pair of hubs 32, 33 having bores 34, 35 therein to receive a pair of shafts (not shown). Set screws 36, 37 extend into bores 34, 35 to fixedly hold the shafts in place on the hubs. Each of the hubs 32, 33 have a flat land 38, 39 thereon into which is cut a groove 40, 41 preferably cylindrical in shape to accommodate a cylindrical resilient element 42. The thickness of the cylindrical element 42 is made greater than the depth of one of the grooves 40, 41 and preferably equal to or greater than the sum of the depths of the two opposing grooves 40, 41 to assure that the lands 38, 39 of the respective hubs will not be in contact or at most just barely so, when the hubs are in assembled relation to each other. As long as the resilient element 42 has a thickness greater than the combined depth of two opposing grooves, the coupling will be able to accommodate shaft misalignment as well via compression of the resilient element.

The grooves 40, 41 extend fully across the land of each hub so that the resilient element 42 can be easily removed and replaced simply by pushing it out and inserting a new one without the necessity of disassembilng the coupling or removing the hubs from the shafts. The grooves 40, 41 need not extend fully across the hub lands but instead may be cut into the land in a manner whereby the exterior surface of the hubs remains uncut. Although not cutting the groove fully across the hub land prevents convenient removability of the resilient elements, it does not affect the torque transmission or shock absorbing capability of the device.

To hold the resilient element 42 in place during rotation of the hubs, seats 43, 44 are cut into each hub, the seats having bores 45, 46 therein to accept screws 47, 48. Interposed between the seats 43, 44 and screws 47, 48 are clamps 49, 50 having bores 51, 52 therein to receive the screws 47, 48. The clamps 49, 50 prevent the resilient element from being thrown out of the grooves 40, 41 by centrifugal force when the coupling is rotating. Even though the resilient element lies on the axis of the coupling, centrifugal force may still be a factor if the resilient element is not perfectly balanced. The resilient element 42 may be held in place by any means other than a clamp, such as the girts of FIGS. 1 and 2 and frictional force as described in conjunction with the FIG. 1 embodiment, but is not limited to only these clamp devices.

In operation, the embodiment of FIG. 3 is essentially the same as that of the embodiment of FIG. 1. One difference is that in the FIG. 3 embodiment, since the resilient element 42 extends across the rotation axis, torque will be more uniformly distributed along the length of the element to give the coupling somewhat greater torque transmission capability.

It will be understood that it is intended to cover all changes and modifications of the preferred embodiments of the invention herein chosen for the purpose of illustration which do not constitute departures from the spirit and scope of the invention.

What is claimed is:

1. A flexible coupling comprising a pair of hubs adapted to be attached to members which are to be coupled, each of said hubs having a flat land surface into which is cut at least one semicylindrical groove, the grooves of one hub being in opposed alignment with the grooves of the other hub; a cylindrical resilient element mounted between at least one pair of said opposed grooves and substantially filling the space therein to torsionally couple said hubs together, whereby rotation of one hub is transferred to the other substantially only through said resilient element.

2. A flexible coupling as in claim 1 wherein the thickness of said cylindrical resilient element is at least equal to the combined depth of said opposed semicylindrical grooves.

3. A flexible coupling as in claim 1 wherein said grooves are cut into said land surfaces to extend through the exteriors of said hubs whereby said cylindrical resilient element is removable from said semicylindrical groove and insertable into said grooves without disassembly of the coupling.

4. A flexible coupling as in claim 3 wherein each hub has four semicylindrical grooves cut therein; said four grooves on each of said lands being in opposed alignment, and four resilient elements, one mounted in each pair of opposed grooves.

5. A flexible coupling as in claim 3 wherein the thickness of said cylindrical resilient element is greater than the combined depth of said opposed semi-cylindrical grooves whereby said hubs are slightly spaced from each other.

6. A flexible coupling as in claim 3 wherein said cylindrical resilient element is made of rubber.

7. A flexible coupling as in claim 3 wherein said cylindrical resilient element is made of a plastic material.

8. A flexible coupling as in claim 3 further comprising means for securing said resilient element in said semicylindrical grooves to prevent said resilient element from being thrown out of said groove by the centrifugal force of the hubs when rotated.

9. A flexible coupling as in claim 8 wherein said means for securing said resilient cylindrical element in said semicylindrical groove comprises a girt, said girt being mounted to the exterior of said hubs and encircling said hub in a position extending across the exterior openings of said grooves.

10. A flexible coupling as in claim 8 wherein said means for securing said cylindrical resilient element in said grooves comprises at least two clamps, one of said clamps being secured at one end thereof to one of said hubs, the second clamp being secured at one end thereof to the other said hub, the other end of each of said clamps at least partially covering the groove opening on the exterior surface of said hubs.

References Cited

UNITED STATES PATENTS

| | | | |
|---|---|---|---|
| 1,368,574 | 2/1921 | Romney | 64—11 |
| 1,980,823 | 11/1934 | Post | 64—11 |
| 2,360,149 | 10/1944 | Moser | 64—11 |

JAMES A. WONG, Primary Examiner

U.S. Cl. X.R.

64—27

PO-1050
(5/69)

UNITED STATES PATENT OFFICE
CERTIFICATE OF CORRECTION

Patent No. 3,525,238     Dated August 25, 1970

Inventor(s) Modesto Beltran Cruz

It is certified that error appears in the above-identified patent and that said Letters Patent are hereby corrected as shown below:

Col. 5, Line 25 (Claim 3): "groove" should read --grooves--

Col. 6, Line 11 (Claim 9): "resilient cylindrical" should read --cylindrical resilient--

Col. 6, Line 18 (Claim 10): "semicylindrical" was omitted before the word "grooves"

SIGNED AND
SEALED
NOV 17 1970

(SEAL)
Attest:

Edward M. Fletcher, Jr.
Attesting Officer

WILLIAM E. SCHUYLER, JR.
Commissioner of Patents